United States Patent
Smeets et al.

(10) Patent No.: US 10,615,961 B2
(45) Date of Patent: Apr. 7, 2020

(54) METHOD AND ENCRYPTION NODE FOR ENCRYPTING MESSAGE

(71) Applicant: TELEFONAKTIEBOLAGET LM ERICSSON (PUBL), Stockholm (SE)

(72) Inventors: Bernard (Ben) Smeets, Dalby (SE); Christine Jost, Lund (SE); Alexander Maximov, Lund (SE)

(73) Assignee: TELEFONATIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 15/575,652

(22) PCT Filed: Jun. 2, 2015

(86) PCT No.: PCT/SE2015/050638
§ 371 (c)(1),
(2) Date: Nov. 20, 2017

(87) PCT Pub. No.: WO2016/195552
PCT Pub. Date: Dec. 8, 2016

(65) Prior Publication Data
US 2018/0115412 A1    Apr. 26, 2018

(51) Int. Cl.
*H04L 9/06*    (2006.01)
*H04L 9/30*    (2006.01)
(Continued)

(52) U.S. Cl.
CPC ............ *H04L 9/0618* (2013.01); *H04L 9/008* (2013.01); *H04L 9/0869* (2013.01); *H04L 9/302* (2013.01);
(Continued)

(58) Field of Classification Search
None
See application file for complete search history.

(56) References Cited

U.S. PATENT DOCUMENTS

| 6,091,819 A | 7/2000 | Venkatesan et al. |
| 7,594,257 B2 * | 9/2009 | Rollins ................. G06F 21/602 380/282 |

(Continued)

FOREIGN PATENT DOCUMENTS

EP    0924895 A2    6/1999

OTHER PUBLICATIONS

Paillier, "Public-Key Cryptosystems Based on Composite Degree Residuosity Classes", 1999 (Year: 1999).*

(Continued)

*Primary Examiner* — Henry Tsang
(74) *Attorney, Agent, or Firm* — Rothwell, Figg, Ernst & Manbeck, P.C.

(57) ABSTRACT

A method and encryption node (300) for providing encryption of a message m according to a selected encryption scheme. A noise computation engine (300a) in the encryption node (300) computes (3:1) a noise factor F as a function of a predefined integer parameter n of the selected encryption scheme and a random number r. When the message m is received (3:3) from a client (302) for encryption, an encryption engine (300b) in the encryption node (300), encrypts (3:4) the message m by computing a cipher text c as $e = g^m \cdot F \mod n^2$, where g is another predefined integer parameter of the selected encryption scheme. The cipher text c is then delivered (3:5) as an encryption of the message m, e.g. to the client (302) or to a cloud of processing resources (304).

21 Claims, 3 Drawing Sheets

(51) Int. Cl.
*H04L 9/00* (2006.01)
*H04L 9/08* (2006.01)
*H04L 29/06* (2006.01)

(52) U.S. Cl.
CPC ...... *H04L 63/0428* (2013.01); *H04L 2209/08* (2013.01)

(56) References Cited

U.S. PATENT DOCUMENTS

| | | | |
|---|---|---|---|
| 7,912,986 B2 * | 3/2011 | Eastman | G06F 16/10 709/247 |
| 8,515,058 B1 | 8/2013 | Gentry | |
| 2012/0317414 A1 * | 12/2012 | Glover | G06Q 10/101 713/165 |
| 2013/0170640 A1 * | 7/2013 | Gentry | H04L 9/008 380/30 |
| 2014/0122866 A1 * | 5/2014 | Haeger | H04L 63/061 713/153 |
| 2014/0233726 A1 | 8/2014 | Yajima et al. | |

OTHER PUBLICATIONS

International Search Report and Written Opinion dated Feb. 8, 2016, in International Application No. PCT/SE2015/050638, 13 pages.
Paillier, "Public-Key Cryptosystems Based on Composite Degree Residuosity Classes" J. Stern (Ed.): EUROCRYPT '99, LNCS 1592, pp. 223-238, 1999.
Extended European Search Report dated Apr. 30, 2018, issued in European Patent Application No. 15894390.2, 10 pages.
Victor Boyko et al., "Speeding up Discrete Log and Factoring Based Schemes via Precomputations", ECCV 2016 conference, Cham, Springer International Publishing, (Jan. 1, 1998), vol. 1403, pp. 221-235.

* cited by examiner

METHOD AND ENCRYPTION NODE FOR ENCRYPTING MESSAGE

CROSS REFERENCE TO RELATED APPLICATION(S)

This application is a 35 U.S.C. § 371 National Phase Entry Application from PCT/SE2015/050638, filed Jun. 2, 2015, designating the United States, the disclosure of which is incorporated herein in its entirety by reference.

TECHNICAL FIELD

The present disclosure relates generally to a method and an encryption node for providing encryption of a message.

BACKGROUND

In the field of data processing and analytics, clients such as different companies, enterprises, organizations and authorities have a need for hardware and software resources in order to perform various data processing operations, e.g. when various recorded information relating to users is analyzed in order to extract knowledge and statistics therefrom. The processing involved in such data analytics may be quite complex and computationally intensive requiring considerable capacity for executing the processing of data.

Traditionally, the clients themselves may own and maintain all the resources they need for data processing which can be quite costly and time-consuming, though. For example, considerable knowledge and skills are typically required first to find out what type of resources is needed, and then to acquire and install those resources. The client thus often needs to employ skilled staff and/or hire consultants to enable efficient deployment of resources. Furthermore, as the technique is developing and progressing rapidly in the field of computers and software, purchased or hired resources tend to become out-of-date very quickly and must frequently be replaced by new resources with better functionality, which is naturally also costly and time-consuming.

Another problem is that a client may need a great amount of resources for a very limited period to make some large computational operation once or just a few times a year, e.g. related to economics, statistics or stock inventory, while very little resources are used during the remainder time. The client thus has to make investments in resources enough to cope with such peak usage and also when demands and operation change over time.

In recent years, it has become possible for clients to hire and utilize resources for data processing, e.g. residing in large data centers comprising a great range of processors, computers and data storages, commonly referred to as cloud computing or simply "the cloud", which can thus be shared by many clients. Effectively, all the needed resources may be available from such a data center and the clients do not have to make their own investments but can instead outsource the processing and analytics to resources in the cloud, or similar.

Sometimes the data to be processed may contain elements that are somehow sensitive to exposure, or in terms of privacy and/or integrity, meaning that it is desirable to protect the data from exposure to any unauthorized party. It may therefore be deemed unsafe to send the data unprotected to any environment where privacy and integrity may be in jeopardy such as shared resources in the cloud. In this context it can thus be assumed that the cloud, or similar shared environments, is deemed untrusted. A solution to this problem is to encrypt the data before sending it to the cloud, or similar. However, many common encryption methods of today have the disadvantage that the encrypted data must be decrypted before any computation or analysis can be made on the data. By using so-called homomorphic encryption methods, certain computations can actually be made on the encrypted data without having to first decrypt the data.

Such encryption may be achieved by using a so-called Fully Homomorphic Encryption, FHE, scheme, although currently known FHE schemes are relatively complex and rather slow in execution. Hence, it may sometimes be more attractive in practice to implement a Partially Homomorphic Encryption, PHE, scheme, which has a better performance in terms of complexity and time.

Addition is one of some basic computational operations that are needed in many use cases. The so-called Paillier cryptosystem is known in this field and it is an additive PHE scheme that can be used for performing addition operations on encrypted data without decrypting the data. In this disclosure, the term "message" will be used to represent a set of data to be encrypted before further processing and analysis. A message in this context thus comprises a numeric value that can be used for addition calculations.

In more detail, the PHE scheme of Paillier satisfies $$Enc(m_1+m_2)=Enc(m_1)\cdot Enc(m_2)$$

where $m_1$ and $m_2$ are two different sets of data or messages in plaintext while "Enc" is an encryption function to obtain a cipher text. The property above makes it possible to compute an encryption of the sum of plaintexts $m_1+m_2$ by multiplying the corresponding cipher texts $Enc(m_1)$ and $Enc(m_2)$ in accordance with the above expression. This property can be used in turn to perform computations on encrypted data without first decrypting the data.

The Paillier cryptosystem is described in more detail in the article "Public-Key Cryptosystems Based on Composite Degree Residuosity Classes", Pascal Paillier, published in J. Stern, Ed., Advances in Cryptology—EUROCRYPT '99, vol. 1592 of Lecture Notes in Computer Science, pp. 223-238, Springer-Verlag, 1999. The Paillier cryptosystem has two different variants referred to as "Scheme 1" and "Scheme 3" which are able to provide the above-described property.

It is thus desirable to encrypt any sensitive messages before processing in a cloud environment or the like while keeping the data in encrypted form by using homomorphic encryption such as the above Paillier cryptosystem. Such encryption of messages using the Paillier cryptosystem is typically a quite complex operation requiring intensive and time-consuming computations and a specialized encryption node is often employed to perform the encryption operation on behalf of a client. FIG. 1 illustrates schematically that an encryption node 100 receives a message m intended for encryption from a client 102, in an action 1:1. In response thereto, the encryption node 100 performs encryption of the message by converting or translating the message m into a ciphertext c, in another action 1:2 using homomorphic encryption such as the above-described Paillier cryptosystem.

The encryption node 100 then returns the ciphertext c as the message m in encrypted form to the client 102, in an action 1:3, while a final action 1:4 illustrates that the client 102 sends a request to a "cloud" 104 of processing resources, for processing the message in the encrypted form, i.e. the ciphertext c. As described above, it is possible to perform certain processing operations on cipher texts encrypted with a homomorphic encryption scheme. For example, it is possible to perform additions on the messages by performing multiplications on the corresponding cipher texts when said cipher texts are encrypted according to the Paillier cryptosystem.

However, it is a problem that the encryption operation using the above-mentioned Paillier cryptosystem involves quite complex and time-consuming computations and it may not be possible to employ it to enable certain analytic operations e.g. in cases where high data throughput is required or when a stream of messages arrives at the encryption node with fluctuating speed. For example, it may be necessary to encrypt a stream of incoming data, i.e. messages, with a high throughput. As an example of a use case scenario in big data analytics, it may happen that data sets, or messages, are issued from multiple sources with a high speed and often irregularly, and that they should be encrypted and sent to a third party's data resources for further analysis, e.g. in untrusted cloud services and databases. In this case the Paillier cryptosystem may not be able to encrypt the stream of incoming data with sufficiently high throughput so that it becomes a bottleneck for applications with demands for high data throughput.

SUMMARY

It is an object of embodiments described herein to address at least some of the problems and issues outlined above. It is possible to achieve this object and others by using a method and an encryption node as defined in the attached independent claims.

According to one aspect, a method is performed by an encryption node of a communication system, for providing encryption of a message m according to a selected encryption scheme. In this method, the encryption node computes, by a noise computation engine in the encryption node, a noise factor F as a function of a predefined integer parameter n of the selected encryption scheme and a random number r. When receiving the message m from a client for encryption, the encryption node encrypts, by an encryption engine in the encryption node, the message m by computing a cipher text c as $$c = g^m \cdot F \bmod n^2,$$

where g is another predefined integer parameter of the selected encryption scheme. The encryption node then delivers the cipher text c as an encryption of the message m.

According to another aspect, an encryption node is arranged to provide encryption of a message m in a communication system according to a selected encryption scheme. The encryption node comprises a noise computation engine and an encryption engine. The encryption node further comprises a processor and a memory. The memory comprises instructions executable by said processor whereby the encryption node is operative to:

compute, by the noise computation engine, a noise factor F as a function of a predefined integer parameter n of the selected encryption scheme and a random number r, receive the message m from a client for encryption, encrypt, by the encryption engine, the message m by computing a cipher text c as $c = g^m \cdot F \bmod n^2$, where g is another predefined integer parameter of the selected encryption scheme, and deliver the cipher text c as an encryption of the message m.

The above method and encryption node may be configured and implemented according to different optional embodiments to accomplish further features and benefits, to be described below.

A computer program storage product is also provided comprising instructions which, when executed on at least one processor in the encryption node, cause the at least one processor to carry out the method described above for the encryption node.

BRIEF DESCRIPTION OF DRAWINGS

The solution will now be described in more detail by means of exemplary embodiments and with reference to the accompanying drawings, in which.

DETAILED DESCRIPTION

Figure 1:
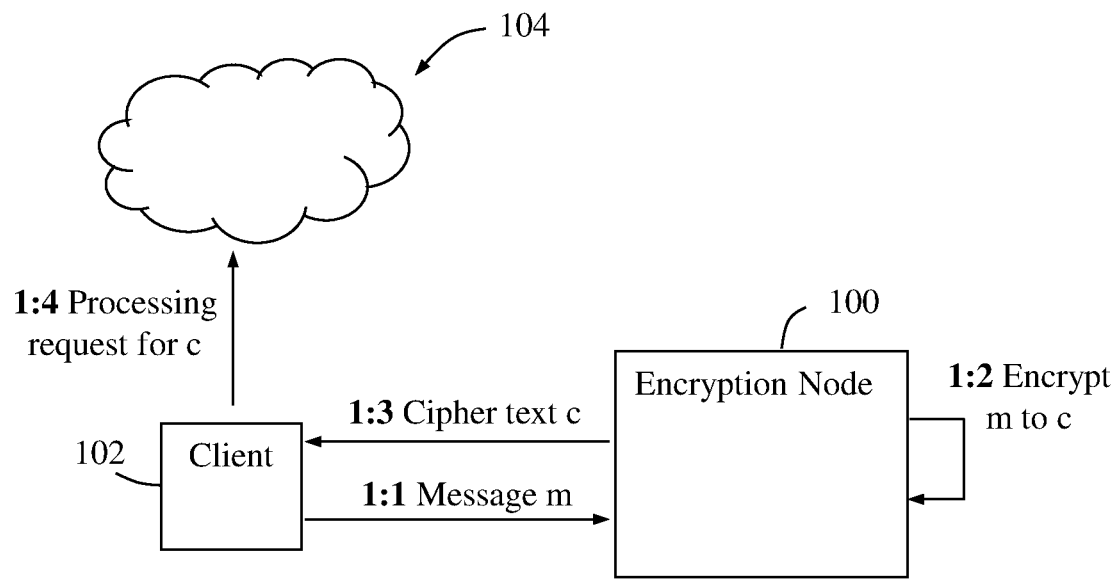
FIG. 1 is a communication scenario illustrating how a client obtains encryption of a message to be processed in a cloud of processing resources, according to the prior art.

Briefly described, a solution is provided to enable more rapid and efficient encryption of messages, e.g. to be processed in encrypted form in a potentially unsafe or untrusted environment where privacy and integrity may be in jeopardy such as when a cloud of shared processing resources is used. In this solution, a noise factor is computed by a noise computation engine and when a message is received from a client, the message is encrypted by an encryption engine which computes a cipher text from the message and the pre-computed noise factor. The cipher text is then delivered as the encrypted message, either to the client or to a cloud of processing resources depending on the implementation.

Thereby, the noise computation engine and the encryption engine can perform their respective computations in parallel independent of one another for successive messages, e.g. received in the manner of a data stream, thus enabling higher throughput of messages as compared to previous solutions, as will be described in more detail herein. It should be noted that a new noise factor, computed by the noise computation engine, is used each time a new message is encrypted.

The solution may be used for cryptosystems that use noise factors whose computation is quite complex and time-consuming, e.g. according to the above-described Paillier cryptosystem. In particular, the solution may be used when noise factors are needed which are random powers of a fixed integer modulo another fixed integer, such as in Scheme 3 of the Paillier cryptosystem. The computation of noise factors therefore normally limits the throughput of message encryption, particularly for messages received in a stream fashion. In this solution disclosed herein, the computation of the noise factor is thus performed separately by the noise computation engine, while not interfering with the encryption engine's operation, and the encryption of a message can be produced quite rapidly by using the separately and independently computed noise factor as input, which thereby generally allows for higher throughput of messages with data.

The solution and its embodiments will be described in terms of functionality in an "encryption node" of a communication system, which can be seen as a logical node that could be arranged in one or more physical nodes and the solution is not limited to any particular implementation in practice. An example of how the solution may be employed will now be described with reference to the flow chart in FIG. 2 which illustrates a procedure with actions performed by an encryption node, to accomplish the advantages outlined above. Reference will also be made to FIG. 3 which illustrates an encryption node 300 that operates in accordance with the actions depicted in FIG. 2. As indicated above, the encryption node 300 has basically two logic functional components, a noise computation engine 300a and an encryption engine 300b. These engines 300a, 300b may be realized as separate units or the like which are independent of one another which in practice could be arranged integrated or separate depending on the implementation.

In this procedure, the encryption node is operative to provide encryption of a message m according to a selected encryption scheme. For example, the message m may be received from a client that wishes to have it processed and/or analyzed in some manner where the message m needs to be protected from exposure, e.g. in a cloud environment or similar, such that it can be processed and/or analyzed in an encrypted form, although the solution is not limited to usage for cloud processing. The solution and its embodiments described herein are thus useful regardless of whether the message m is to be processed/analyzed in encrypted or decrypted form. The actual processing and/or analyzing of the message m after encryption is outside the scope of the solution and embodiments described herein.

In more detail, FIG. 3 illustrates an example of a communication scenario where the solution is employed involving the encryption node 300 and a client 302 which sends a series of messages $m_1$, $m_2$, $m_3$, . . . in the manner of a data stream, to be encrypted by the encryption node 300, although the solution is not limited to a data stream. Each message may effectively be seen as a request from the client for encryption of the message. It may thus be of interest to achieve a high throughput in the encryption of such a data stream of messages, e.g. in terms of data rate, which can be accomplished by computing the noise factor for each message separately from the actual encryption operation, so that the computed noise factor can be used as input to the encryption operation in the manner described below.

The solution described herein may be employed in different ways. For example, the computation of the noise factor may be made "off-line" in advance, while the encryption of an incoming message m can then be made in real-time using the previously computed noise factor. In this case, any number of noise factors may be computed by the noise computation engine 300a in advance and these noise factors may be cached or stored for future use, to be retrieved whenever messages are received for encryption. It is also possible that the noise computation engine 300a computes a noise factor at the same time, i.e. in parallel, as the encryption engine 300b performs at least an initial part of the encryption of a message, which will be described in more detail later below.

Although the examples and embodiments herein mainly refer to encryption of "a message", it can be understood that this procedure may be applied for each message of a stream or any number of successive messages, e.g. repeatedly when messages to be encrypted are received in a data stream, or alone for a single message, one at a time, and the solution is not limited in this respect.

A first action 200 illustrates that the encryption node computes, by the noise computation engine 300a in the encryption node 300, a noise factor F as a function of a predefined integer parameter n of the selected encryption scheme and a random number r.

In a possible embodiment, the selected encryption scheme may correspond to Scheme 1 of the Paillier cryptosystem, and in this case the noise factor F is computed as $F=r^n$ mod $n^2$, which is thus required by Scheme 1 of the Paillier cryptosystem. In another alternative embodiment, the selected encryption scheme may correspond to Scheme 3 of the Paillier cryptosystem, and in this case the noise factor F is computed somewhat differently as $F=g^{nr}$ mod $n^2$, which is thus required by Scheme 3 of the Paillier cryptosystem, where g is another predefined integer parameter of the selected encryption scheme. In these two formulas, "mod" is short for the well-known mathematic operation called "modulo".

This operation of computing the noise factor F is also illustrated as an action 3:1 in FIG. 3 where the noise computation engine 300a uses n and possibly also g as predefined input parameters while the random number r is an integer generated randomly by the noise computation engine 300a in the encryption node.

In a further possible embodiment, the predefined integer parameter g may be an element in the multiplicative group $Z^*_{n^2}$, which embodiment is useful to allow or facilitate later decryption of the cipher text. The multiplicative group $Z^*_{n^2}$ is a well-known mathematic object which can be employed e.g. in the fields of cryptography, group theory and other computation areas. The multiplicative group $Z^*_{n^2}$ includes the numbers from 1 to $n^2-1$ whose greatest common divisor with $n^2$ is 1. In another alternative embodiment, the predefined integer parameter n may be calculated as $n=p \cdot q$ where p and q are predefined prime numbers of the selected encryption scheme. The prime numbers p and q are thus parameters given by the selected encryption scheme.

FIG. 3 further illustrates that the noise computation engine 300a may save, or cache, the computed noise factor F in a suitable storage 300c for later use in the encryption of a message. The storage 300c may be arranged as part of the encryption node 300, as shown in FIG. 3, or as an external storage that can be accessed by the encryption node 300. In another possible embodiment, the noise computation engine 300a may compute multiple noise factors F to be used for encryption of multiple incoming messages. In the meantime, the computed noise factors F can be saved in the storage 300c for later retrieval once a message is received. In a further possible embodiment, the noise computation engine 300a may send the computed noise factor F to the encryption engine 300b in response to a request from the encryption engine 300b, which is also illustrated by an action 3:2 in FIG. 3.

In a next action 202, the encryption node receives the message m from the client which is also illustrated as an action 3:2 in FIG. 3 where the encryption node 300 receives a series of messages $m_1$, $m_2$, $m_3$, . . . from the client 302 in the manner of a data stream. The procedure in FIG. 2, at least from action 202 onwards, may thus be performed for each message such as the messages $m_1$, $m_2$, $m_3$, . . . shown in FIG. 3, e.g. after action 200 if multiple noise factors were computed and saved in that action. In a possible embodiment, the encryption node may thus receive the message m from the client in a data stream of messages to be encrypted. In this communication, any protocol may be used that is suitable for transferring a message to be encrypted, e.g. the hyper-text transfer protocol http or the file transfer protocol ftp over an IP (Internet Protocol) network.

Another action 204 illustrates that the encryption node encrypts, by the encryption engine 300b in the encryption node 300, the message m by computing a cipher-text c as $$c = g^m \cdot F \bmod n^2,$$

where g is thus another predefined integer parameter of the selected encryption scheme, as mentioned above. Hence, the ciphertext c is determined by multiplying the noise factor F computed in action 200 with the predefined integer parameter g to the power of the message m, modulo $n^2$. The noise factor F is thereby used for effectively hiding or "masking" the message m in the ciphertext c. This is also illustrated in FIG. 3 by action 3:4 which indicates encryption of each incoming message $m_1, m_2, m_3, \ldots$ according to action 204.

A final shown action 206 illustrates that the encryption node eventually delivers the cipher text c as an encrypted message, either to the client or directly to a cloud of processing resources 304 depending on the implementation. In this communication, any protocol may be used that is suitable for transferring a cipher-text c, e.g. the hyper-text transfer protocol http or the file transfer protocol ftp over an IP network. This is also illustrated in FIG. 3 by action 3:5 which indicates that a series of cipher texts $c_1, c_2, c_3, \ldots$ may be returned as encrypted messages to the client in response to the series of messages $m_1, m_2, m_3, \ldots$ received from the client 302, hence in the manner of a data stream.

A dashed arrow in FIG. 3 indicates that the encryption node 300 may alternatively deliver the cipher texts $c_1, c_2, c_3, \ldots$ as encrypted messages directly to the cloud of processing resources 304. Thus in some possible embodiments, the encryption node 300 may deliver the cipher-text c to the client 302 or to the cloud of processing resources 304. In further possible embodiments, at least one of receiving the message m as of actions 202 and 3:3 and delivering the ciphertext c as of actions 206 and 3:5 may be performed using a hyper-text transfer protocol http or a file transfer protocol ftp, although any other suitable communication protocol may be used depending on implementation.

As indicated above, actions 202-206 and 3:3-3:5, respectively, can be repeated for each incoming message $m_1, m_2, m_3, \ldots$, in the manner described above, while actions 200 and 3:1, respectively, may be performed as a "preparation step" in beforehand to produce multiple noise factors F for later use whenever messages for encryption are received. Alternatively, actions 200 and 3:1, respectively, may be performed to produce one noise factor F at a time to be used for encryption of a specific message, and a new noise factor F will be computed for the next received message, and so forth.

Moreover, actions 200 and 3:1 may optionally be performed more or less in parallel with actions 204 and 3:4, respectively, for a certain message such that the noise factor F is computed by the noise computing engine 300a at the same time as the encryption engine 300b computes an initial part, i.e. the "message part" of the cipher text $c = g^m \cdot F \bmod n^2$, the message part being $g^m \bmod n^2$ which is then multiplied with the independently computed noise factor F to produce the resulting ciphertext c. The procedure described herein can thus work with high performance regardless of whether the noise factor F is computed in advance or in parallel with the cipher text. Thereby, the encryption node 300 is able to operate more efficiently and rapidly by means of the independent engines 300a, 300b, e.g. working in parallel, as compared to conventional solutions.

It was mentioned above that the selected encryption scheme used in this procedure may correspond to Scheme 1 of the Paillier cryptosystem or to Scheme 3 of the Paillier cryptosystem. It will now be described in more detail how Scheme 3 of the Paillier cryptosystem may be used in the above procedure. Scheme 3 of the Paillier cryptosystem as such can be generally described as follows.

Parameters to be used in this procedure typically include private keys and public keys. As usual for asymmetric cryptography, anyone who knows the public keys can encrypt a message, but only those knowing the private keys can decrypt that message. The private keys typically include: two prime numbers p and q, and an integer a which is a positive divisor of λ which in turn is the least common multiple of p−1 and q−1.

The public keys are n=p·q, and an element g in $Z^*_{n^2}$ such that the order of g is α·n.

Encryption of a plaintext message m<n is accomplished by selecting a random number r<n and determining the ciphertext c as $$c = g^m \cdot g^{n \cdot r} \bmod n^2$$

The factor $g^{n \cdot r} \bmod n^2$ can be interpreted as the noise factor that the expression $g^m \bmod n^2$ is multiplied with.

Furthermore, Scheme 1 of the Paillier cryptosystem as such is quite similar to the above-described Scheme 3, in that both schemes involve a noise factor F that can be computed independent of the message, and Scheme 1 can be generally described as follows.

Parameters to be used in this procedure likewise include private keys and public keys. The private keys typically include: two prime numbers p and q, and λ which is the least common multiple of p−1 and q−1.

The public keys are n=p·q, and an element g in $Z^*_{n^2}$ such that the order of g is a multiple of n.

Encryption of a plaintext message m<n is accomplished by selecting a random number R<n and determining the ciphertext c as $$c = g^m \cdot r^n \bmod n^2$$

The factor $r^n \bmod n^2$ can be interpreted as the noise factor that the expression $g^m \bmod n^2$ is multiplied with.

Figure 4:
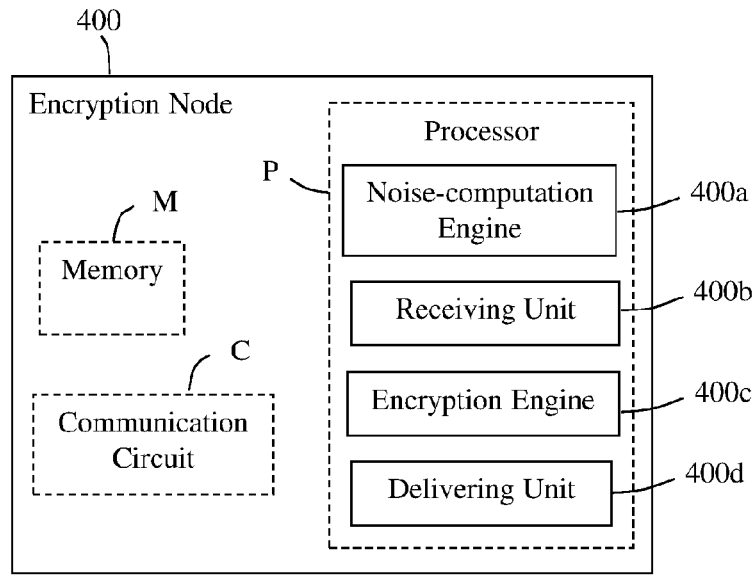
FIG. 4 is a block diagram illustrating an encryption node in more detail, according to further possible embodiments.

The block diagram in FIG. 4 illustrates a detailed but non-limiting example of how an encryption node 400 may be structured to bring about the above-described solution and embodiments thereof. In this figure, the encryption node 400 may thus be configured to operate according to any of the examples and embodiments of employing the solution as described above, where appropriate, and as follows. The encryption node 400 in this example is shown in a configuration that comprises a processor "P", a memory "M" and a communication circuit "C" with suitable equipment for receiving and transmitting information and data in the manner described herein.

The communication circuit C in the encryption node 400 thus comprises equipment configured for communication with at least a client, not shown, using one or more suitable communication protocols such as http or ftp, depending on implementation. As in the examples discussed above, the encryption node 400 may be configured or arranged to perform at least the actions of the procedures illustrated in FIG. 2 and FIG. 3 in the manner described above. These actions may be performed by means of functional units in the processor P in the encryption node 400 as follows.

The encryption node 400 is arranged to provide encryption of a message m in a communication system according to a selected encryption scheme. The encryption node 400 thus comprises a noise computation engine 400a and an encryption engine 400c. The encryption node 400 further comprises the processor P and the memory M, said memory comprising instructions executable by said processor, whereby the encryption node 400 is operable as follows.

The encryption node 400 is configured to compute, by a noise computation engine in the encryption node 400, a noise factor F as a function of a predefined integer parameter n of the selected encryption scheme and a random number r.

This computing operation is performed by the noise-computation engine 400a, e.g. in the manner described for actions 200 and 3:1 above. The encryption node 400 is also configured to receive a request from a client for encryption of the message m. This receiving operation may be performed by a receiving unit 400b in the encryption node 400, e.g. in the manner described for action 202 above.

The encryption node 400 is further configured to encrypt, by an encryption engine in the encryption node 400, the message m by computing a cipher text c as $$c = g^m \cdot F \bmod n^2,$$

where g is another predefined integer parameter of the selected encryption scheme. This operation is performed by the encryption engine 400c, e.g. in the manner described for action 204 above. The encryption node 400 is further configured to deliver the cipher text c as an encrypted message, either to the client or to a cloud of processing resources. This delivering operation may be performed by a delivering unit 400d in the encryption node 400, e.g. in the manner described for action 206 above.

It should be noted that FIG. 4 illustrates some possible functional units in the encryption node 400 and the skilled person is able to implement these functional units in practice using suitable software and hardware. Thus, the solution is generally not limited to the shown structure of the encryption node 400, and the functional units 400a-d may be configured to operate according to any of the features described in this disclosure, where appropriate.

Figure 2:
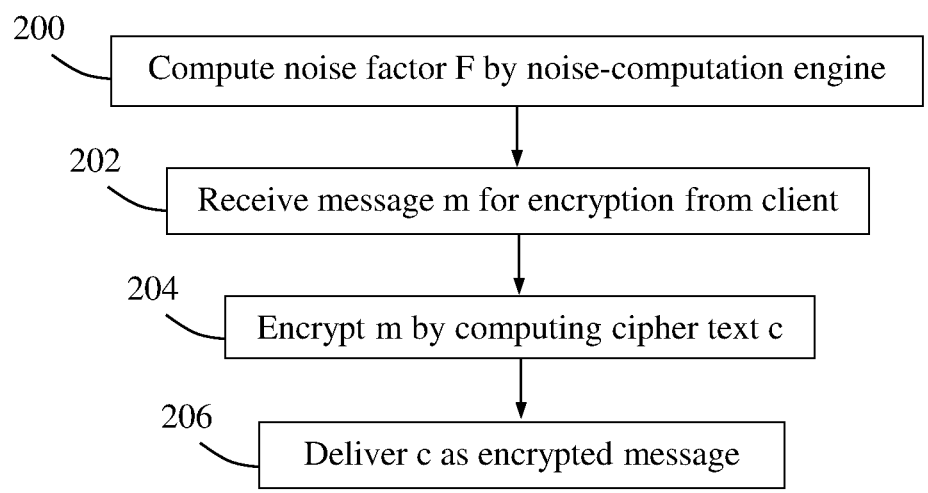
FIG. 2 is a flow chart illustrating a procedure in an encryption node, according to some possible embodiments.
Figure 3:
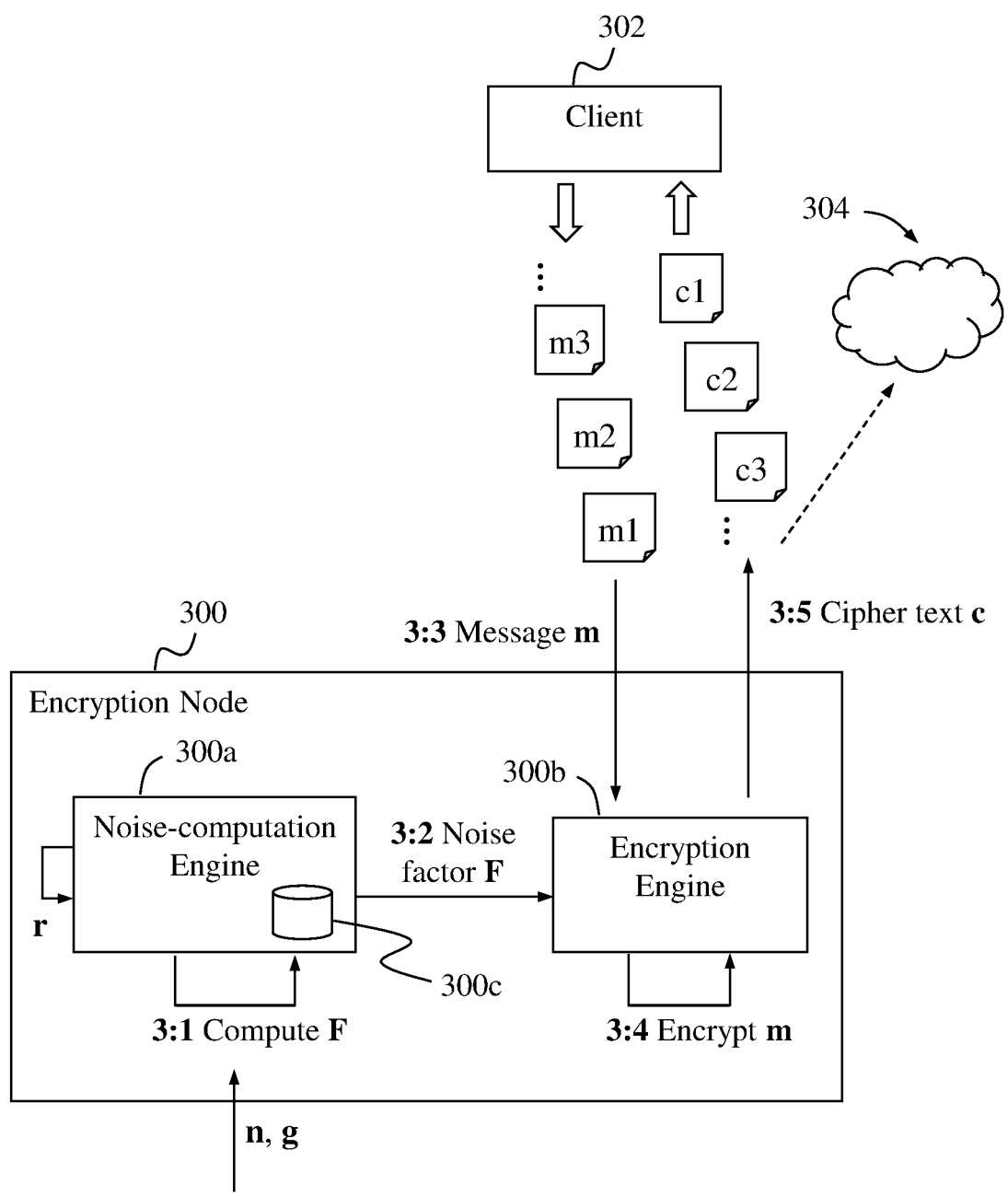
FIG. 3 is a communication scenario illustrating an example of how the solution may be employed by means of an encryption node, according to further possible embodiments.

The embodiments and features described herein may thus be implemented in a computer program storage product comprising instructions which, when executed on at least one processor, cause the at least one processor to carry out the above actions and functions e.g. as described for any of FIGS. 2 and 3. Some examples of how the computer program storage product can be realized in practice are outlined below, and with further reference to FIG. 4.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the encryption node 400.

Figure 5:
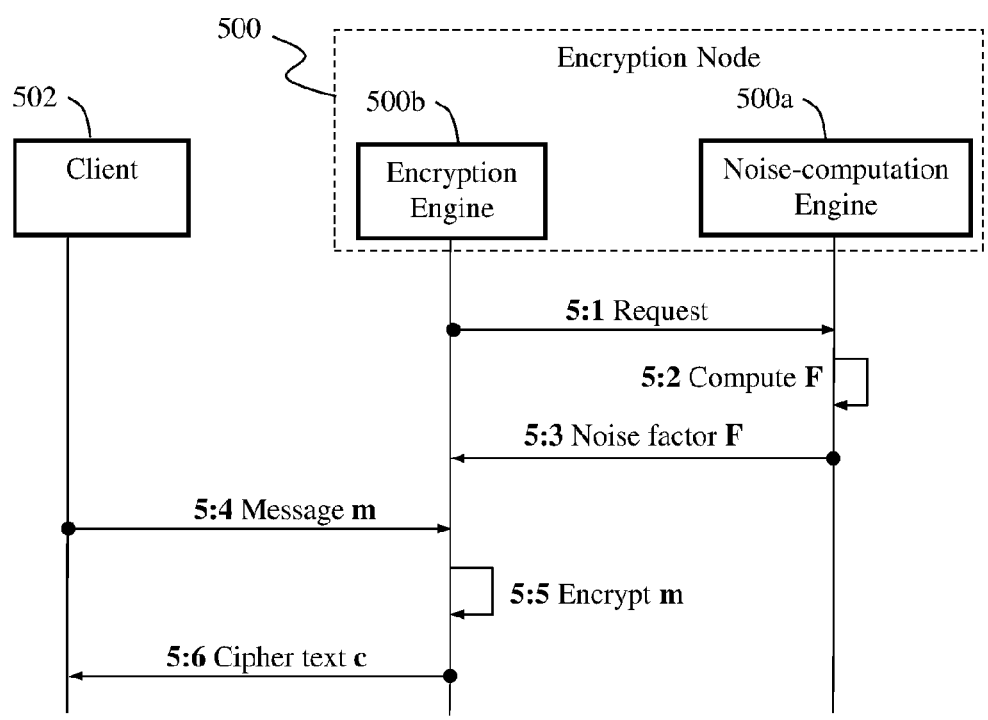
FIG. 5 is a signaling diagram illustrating how an encryption node may operate in practice, according to further possible embodiments.

An example of how the above-described encryption node may operate and communicate with a client according to some of the embodiments herein, will now be described with reference to the signaling diagram in FIG. 5. In this example, the encryption node 500 is shown to comprise a noise computation engine 500a and an encryption engine 500b, which engines correspond to the noise computation engine 300a and encryption engine 300b described above for FIG. 3. In this example, the encryption engine 500b sends a request for a noise factor F to the noise computation engine 500a, in an action 5:1. In response thereto, the noise computation engine 500a computes a noise factor F in an action 5:2, and sends the noise factor F to the encryption engine 500b in a following action 5:3. Action 5:2 may be performed in the manner described above for actions 200 and 3:1.

A further action 5:4 illustrates that the encryption node 500 receives a message m from the client 502, which message is encrypted by the encryption engine 500b in a next action 5:5 by computing a ciphertext c, which may be performed in the manner described above for actions 204 and 3:4. A final action 5:6 illustrates that the encryption node 500 delivers the ciphertext c as an encrypted message to the client 502.

The above procedure may be modified is different ways, depending on the implementation. For example, the noise computation engine 300a may compute one or more noise factors F in advance which are saved for use whenever needed, such that action 5:2 takes place initially, that is before the remaining actions. Further, the encryption engine 500b may send a request for a noise factor F to the noise computation engine 500a after having received the message m from the client 502, such that actions 5:1 and 5:3 take place after action 5:4. Thus, one possible alternative order of the above-described actions 5:1-5:5 could be:

5:2-5:4-5:1-5:3-5:5.

Another possible alternative order of the above-described actions 5:1-5:5 could be:

5:4-5:1-5:2-5:3 while 5:5 is performed at least partly in parallel with 5:2 such that the noise factor F is computed by the noise computation engine 500a at the same time the message part of the cipher-text c is computed by the encryption engine 500b. Even though some different examples and alternatives of how the procedure might be executed have been suggested above, it should be understood that the solution may be practiced in any suitable manner not limited to these examples.

While the solution has been described with reference to specific exemplifying embodiments, the description is generally only intended to illustrate the inventive concept and should not be taken as limiting the scope of the solution. For example, the terms "encryption node", "noise computation engine", "encryption engine", "message", "noise factor" and "ciphertext" have been used throughout this disclosure, although any other corresponding entities, functions, and/or parameters could also be used having the features and characteristics described here. The solution is defined by the appended claims.

The invention claimed is:

1. A method performed by an encryption node of a communication system for providing encryption of a message m according to a selected encryption scheme, the method comprising:

computing, by a noise computation engine in the encryption node, a noise factor F as a function of a predefined integer parameter n of the selected encryption scheme and a random number r, using a modulo operation, receiving the message m from a client for encryption, encrypting, by an encryption engine in the encryption node, the message m by computing a cipher text c as $c=g^m \cdot F \bmod n^2$, where g is another predefined integer parameter of the selected encryption scheme, and delivering the cipher text c as an encryption of the message m.

2. The method according to claim 1, wherein the encryption node receives the message m in a data stream of messages to be encrypted.

3. The method according to claim 1, wherein the encryption node delivers the cipher text c to the client or to a cloud of processing resources.

4. The method according to claim 1, wherein the noise computation engine sends the computed noise factor F to the encryption engine in response to a request from the encryption engine.

5. The method according to claim 1, wherein the noise computation engine computes multiple noise factors F to be used for encryption of multiple incoming messages.

6. The method according to claim 1, wherein the predefined integer parameter g is an element in a multiplicative group $Z^*_{n^2}$.

7. The method according to claim 1, wherein the predefined integer parameter n is determined as $n=p \cdot q$ where p and q are predefined prime numbers of the selected encryption scheme.

8. The method according to claim 1, wherein the selected encryption scheme corresponds to Scheme 1 of a Paillier cryptosystem, and the noise factor F is computed as $F=r^n \bmod n^2$.

9. The method according to claim 1, wherein the selected encryption scheme corresponds to Scheme 3 of a Paillier cryptosystem, and the noise factor F is computed as $F=g^{nr} \bmod n^2$.

10. The method according to claim 1, wherein at least one of receiving the message m and delivering the cipher text c is performed using a hyper-text transfer protocol (http) or a file transfer protocol (ftp).

11. An encryption node arranged to provide encryption of a message m in a communication system according to a selected encryption scheme, wherein the encryption node comprises a noise computation engine and an encryption engine, the encryption node further comprising a processor (P) and a memory (M), said memory comprising instructions executable by said processor whereby the encryption node is operative to:

compute, by the noise computation engine, a noise factor F as a function of a predefined integer parameter n of the selected encryption scheme and a random number r, using a modulo operation, receive the message m from a client for encryption, encrypt, by the encryption engine, the message m by computing a cipher text c as $c=g^m \cdot F \bmod n^2$, where g is another predefined integer parameter of the selected encryption scheme, and deliver the cipher text c as an encryption of the message m.

12. The encryption node according to claim 11, wherein the encryption node is configured to receive the message m in a data stream of messages to be encrypted.

13. The encryption node according to claim 11, wherein the encryption node is configured to deliver the cipher text c to the client or to a cloud of processing resources.

14. The encryption node according to claim 11, wherein the encryption node is configured to send the computed noise factor F from the noise computation engine to the encryption engine in response to a request from the encryption engine.

15. The encryption node according to claim 11, wherein the encryption node is configured to compute multiple noise factors F, by the noise computation engine, to be used for encryption of multiple incoming messages.

16. The encryption node according to claim 11, wherein the predefined integer parameter g is an element in a multiplicative group $Z^*_{n^2}$.

17. The encryption node according to claim 11, wherein the encryption node is configured to determine the predefined integer parameter n as $n=p \cdot q$ where p and q are predefined prime numbers of the selected encryption scheme.

18. The encryption node according to claim 11, wherein the selected encryption scheme corresponds to Scheme 1 of a Paillier cryptosystem, and the encryption node is configured to compute the noise factor F as $F=r^n \bmod n^2$.

19. The encryption node according to claim 11, wherein the selected encryption scheme corresponds to Scheme 3 of a Paillier cryptosystem, and the encryption node is configured to compute the noise factor F as $F=g^{nr} \bmod n^2$.

20. The encryption node according to claim 11, wherein the encryption node is configured to perform at least one of receiving the message m and delivering the cipher text c, by using a hyper-text transfer protocol (http) or a file transfer protocol (ftp).

21. A non-transitory computer program storage product comprising instructions which, when executed on at least one processor, cause the at least one processor to carry out the method according to claim 1.

* * * * *